United States Patent
Mueller et al.

(10) Patent No.: US 10,226,763 B2
(45) Date of Patent: Mar. 12, 2019

(54) PROCESS FOR PREPARING A HETEROATOM-COMPRISING SILICATE

(71) Applicants: BASF SE, Ludwigshafen (DE); RUBITEC-GESELLSCHAFT FUER INNOVATION UND TECHNOLOGIE DER RUHR-UNIVERSITAET BOCHUM MBH, Bochum (DE)

(72) Inventors: Ulrich Mueller, Neustadt (DE); Natalia Trukhan, Ludwigshafen (DE); Hermann Gies, Sprockhoevel (DE); Bart Tijsebaert, Sint-Andries (BE); Csaba Varszegi, Genk (BE); Dirk De Vos, Holsbeek (BE)

(73) Assignees: BASF SE, Ludwigshafen (DE); RUBITEC-GESELLSCHAFT FUER INNOVATION UND TECHNOLOGIE DER RUHR-UNIVERSITAET BOCHUM MBH, Bochum (DE)

( * ) Notice: Subject to any disclaimer, the term of this patent is extended or adjusted under 35 U.S.C. 154(b) by 266 days.

(21) Appl. No.: 14/947,981

(22) Filed: Nov. 20, 2015

(65) Prior Publication Data
US 2016/0074851 A1 Mar. 17, 2016

Related U.S. Application Data

(62) Division of application No. 12/594,727, filed as application No. PCT/EP2008/054046 on Apr. 3, 2008, now Pat. No. 9,221,692.

(30) Foreign Application Priority Data

Apr. 4, 2007 (EP) .................................. 07105621

(51) Int. Cl.
*B01J 29/04* (2006.01)
*B01J 29/87* (2006.01)
(Continued)

(52) U.S. Cl.
CPC ............... *B01J 29/87* (2013.01); *B01J 29/04* (2013.01); *B01J 29/048* (2013.01); *C01B 39/06* (2013.01);
(Continued)

(58) Field of Classification Search
CPC .......... B01J 29/04; B01J 29/048; B01J 29/87; C04B 35/16; C04B 35/62655; C04B 35/62675; C04B 35/624; C04B 2235/612
(Continued)

(56) References Cited

U.S. PATENT DOCUMENTS

| 4,495,303 A | 1/1985 | Kuehl |
| 4,552,739 A | 11/1985 | Kuhl |

(Continued)

FOREIGN PATENT DOCUMENTS

| DE | 10 2005 049 362 A1 | 4/2007 |
| EP | 327189 A2 | 8/1989 |

(Continued)

OTHER PUBLICATIONS

Caro, J. et al., "Zeolite membranes—state of their development and perspective", Microoorous and Mesooorous Materials 38 2000,3-24.
(Continued)

*Primary Examiner* — Jun Li
(74) *Attorney, Agent, or Firm* — Oblon, McClelland, Maier & Neustadt, L.L.P.

(57) ABSTRACT

The present invention relates to a process for preparing at least one sheet silicate comprising Ga and/or Zn, and based thereon, a framework silicate, preferably of the RRO struc-
(Continued)

ture type, to the sheet silicate and framework silicate themselves and to the uses of the silicates, especially of the framework silicate, preferably as catalysts.

14 Claims, 5 Drawing Sheets

(51) Int. Cl.
    *C01B 39/48* (2006.01)
    *C01B 39/06* (2006.01)
    *C04B 35/16* (2006.01)
    *C04B 35/624* (2006.01)
    *C04B 35/626* (2006.01)

(52) U.S. Cl.
    CPC .............. *C01B 39/48* (2013.01); *C04B 35/16* (2013.01); *C04B 35/624* (2013.01); *C04B 35/62655* (2013.01); *C04B 35/62675* (2013.01); *C04B 2235/3284* (2013.01); *C04B 2235/3286* (2013.01); *C04B 2235/6021* (2013.01); *C04B 2235/612* (2013.01); *Y02P 20/582* (2015.11)

(58) Field of Classification Search
    USPC .................................................. 402/700, 704
    See application file for complete search history.

(56) References Cited

U.S. PATENT DOCUMENTS

| | | | |
|---|---|---|---|
| 4,806,327 | A | 2/1989 | Rieck et al. |
| 5,365,002 | A | 11/1994 | Wallau et al. |
| 6,380,119 | B1 | 4/2002 | Grosch et al. |
| 6,752,980 | B1 | 6/2004 | Moscoso et al. |
| 6,756,030 | B1 | 6/2004 | Rohde et al. |
| 7,947,244 | B2 | 5/2011 | Mueller et al. |
| 8,372,378 | B2 | 2/2013 | Mueller et al. |
| 8,426,332 | B2 * | 4/2013 | Yilmaz ............... B01J 29/049 502/60 |
| 2005/0271582 | A1 | 12/2005 | Barea et al. |
| 2006/0105903 | A1 * | 5/2006 | Tatsumi ............... B01J 29/041 502/60 |
| 2008/0000354 | A1 | 1/2008 | Muller et al. |
| 2008/0253953 | A1 | 10/2008 | Muller et al. |
| 2011/0135567 | A1 | 6/2011 | Müller et al. |
| 2011/0182793 | A1 | 7/2011 | Müller et al. |
| 2012/0016045 | A1 * | 1/2012 | Yilmaz ............... B01J 20/10 521/50 |

FOREIGN PATENT DOCUMENTS

| | | |
|---|---|---|
| JP | 61-286215 | 12/1986 |
| JP | 2001-224216 | 8/2001 |
| JP | 2002-504014 | 2/2002 |
| JP | 2002-184517 | 6/2002 |
| JP | 2004-254411 | 9/2004 |
| JP | 2005-262515 | 9/2005 |
| JP | 2006-009212 | 1/2006 |
| JP | 2007-532460 | 11/2007 |
| JP | 2009-511409 | 3/2009 |
| WO | 98 55228 | 12/1998 |
| WO | 03 068679 | 8/2003 |
| WO | 2005 100242 | 10/2005 |
| WO | WO 2007/042531 A2 | 4/2007 |
| WO | WO 2007/042531 A3 | 4/2007 |

OTHER PUBLICATIONS

Caro, Juergen et al., "Zeolite membranes—Recent developments and progress", Microoorous and Mesooorous Materials 115 2008, 215-233.
Dincer, Eser et al., "Effect of seeding on the properties of MFI type zeolite membranes", Desalination 200 2006,66-67.
Ikeda, T. et al., "Crystal Structure of a Helix Layered Silicate Containing Tetramethylammonium Ions in Sodalite-Like Cages", Chem. Mater., 13 2001, 1286-1295.
Li, Zhaofei et al., "A New Layered Silicate with Structural Motives of Silicate Zeolites: Synthesis, Crystals Structure, and Properties", Chem. Mater., 20 2008, 1896-1901.
Munzer, Simon et al., "Preparation and characterization of sodium-free nanocrystalline sodalite", MicroQorous and MesoQorous Materials 110 2008, 3-10.
Oberhagemann, Uwe et al., "Ein neuer Schichtsilicatstrukturtyp: derZeolithvorlaufer RUB-15 [N(CH3)41s[Si24052(OH)41- 20H20)", Angew. Chem., 108, Nr. 23/24 1996, 4 pgs.
Oumi, Yasunori et al., "Convenient conversion of crystalline layered silicate octosilicate into RWR-type zeolite by acetic acid intercalation", New Journal of Chemistrv.31 2007,593-597.
Van Der Donk, George et al., "Formation of clathrasillayers by secondary growth of DOH-type nuclei for gas separation applications", MicroQorous and Mesooorous Materials 115 2008, 3-10.
Office Action dated Mar. 13, 2013, in Japanese patent application No. 2010-501518 (partial English translation only).
Office Action dated Mar. 13, 2013, in Japanese patent application No. 2010-501518—partial English translation previously submitted on May 6, 2013.
Wang, Y. X. et al., "Synthesis and Crystal Structure of Zeolite RUB-41 Obtained As Calcination Product of a Layered Precursor: A Systematic Approach to a New Synthesis Route", Chem. Mater, vol. 17, No. 1, pp. 43-49 (Dec. 15, 2005) XP002520803.
Wang, Y. X. et al., "Crystal Structure of the New Layer Silicate RUB-39 and Its Topotactic Condensation to A Microporous Zeolite With Framework Type RRO", Chem. Mater, vol. 19, No. 17, pp. 4181-4188 (Jul. 21, 2007) XP 002520804.
Marler, B. et al., "The Structure of the New Pure Silica Zeolite RUB-24, $Si_{32}O_{64}$, Obtained by Topotactic Condensation of The Intercalated Layer Silicate RUB-18", Microporous and Mesoporous Materials, vol. 83, No. 1-3, pp. 201-211 (Jun. 13, 2005) XP002520805.
Bhat, Y.S. et al., "MFI Metallosilicates Catalyzed Ortho-And Para-Toluidine Conversion", Journal of Molecular Catalysis A: Chemical, vol. 111, No. 3, pp. 307-311 (Sep. 25, 1996) XP002520806.
Yuan, S. et al., "Siting of B, Al, Ga or Zn and Bridging Hydroxyl Groups in Mordenite: An Ab lnitio Study", Journal of Molecular Catalysis A; Chemical, vol. 175, No. 1-2, p. 131-138, (2001) XP002520807.
Wang,Y. et al., "The Substitution of Germanium for Silicon in AST-Type Zeolite", Solid State Sciences, vol. 5, pp. 1421-1433 (2003).
Patent Family Search for U.S. Pat. No. 7947244B2 dated Aug. 7, 2015.
Patent Family Search for U.S. Pat. No. 8372378B2 dated Aug. 7, 2015.

* cited by examiner

PROCESS FOR PREPARING A HETEROATOM-COMPRISING SILICATE

CROSS REFERENCE TO RELATED APPLICATIONS

The present application is a divisional of U.S. patent application Ser. No. 12/594,727, filed on Dec. 30, 2009, which is a 35 U.S.C. § 371 national stage patent application of international patent application PCT/EP08/054046, filed on Apr. 3, 2008, which claims priority to Japanese patent applications EP 07105621.2, filed on Apr. 4, 2007.

The present invention relates to a process for preparing silicates which have the RUB-39 or RRO (RUB-41) zeolite structure and comprise at least Ga and/or Zn as a heteroatom in the silicate lattice. The process according to the invention further features the preferred use of a silicate of the Si-RUB-39 structure as a crystallization assistant in the hydrothermal synthesis of the heteroatom-comprising silicate. The present invention further relates to the silicates which are preparable by the process according to the invention, to the silicates themselves and to uses of these silicates.

A frequently encountered task in chemical production or purification processes is that of removing at least one substance from a substance mixture, or quite generally the separation of substance mixtures. In principle, this separation can be achieved by distillative methods. However—especially in the case of very close-boiling mixtures—these distillative methods are performable in an economically viable manner only using assistants, if at all. One example of the separation of close-boiling mixtures is the separation of alkanes or alkenes, for example the separation of isomeric alkanes or alkenes. A further frequently encountered task in chemical production processes, whether on the laboratory scale, pilot plant scale or industrial scale, is that of providing catalysts suitable for particular reactions.

WO 2005/100242 A1 discloses microporous framework silicates and processes for preparation thereof. This involves mixing the reactants from which the precursor of the framework silicate is crystallized without any addition of a crystallization assistant, with subsequent hydrothermal treatment. This results in crystallization times which can be considered to be too long in particular fields of use.

The framework silicate described in WO 2005/100242 A1 is also described in Y. X. Wang et al., Chem. Mater. 17, 2005, p. 43-49, the synthesis process described in the context of this scientific article also being performed without the use of a crystallization assistant, and crystallization times of 15 to 45 days being described.

It was therefore one of the objects underlying the present invention to provide novel compounds which can be used as molecular sieves, adsorbents and/or as catalysts.

A further object underlying the present invention was to provide a process for preparing these compounds.

A further object underlying the present invention was to provide novel silicates, especially zeolites, which can firstly be used advantageously for the end uses described above, but equally also for any further conceivable purpose or in other technical fields.

Accordingly, the present invention relates to a process for preparing a silicate comprising at least silicon, oxygen and at least one heteroatom selected from the group consisting of Ga and Zn, comprising (1) preparing a colloidal aqueous solution from at least one silicon dioxide source, at least one tetraalkylammonium compound comprising $R_1R_2R_3R_4N^+$ where $R_1$ and $R_2$ are each methyl and both $R_3$ and $R_4$ are n-propyl, at least one base, at least one crystallization assistant and at least one heteroatom source selected from the group consisting of a Ga source and a Zn source;

(2) hydrothermally crystallizing by heating the colloidal aqueous solution obtained in (1) to a temperature in the range from greater than the boiling temperature of the colloidal aqueous solution under the selected pressure to 180° C. at standard pressure to obtain a suspension comprising at least one silicate comprising silicon, oxygen and at least the heteroatom selected from the group consisting of Ga and Zn, wherein the crystallization assistant used in (1) is a silicate with the structure of the silicate obtained in (2).

The temperature in the preparation of the colloidal aqueous solution in (1) is preferably in the range from 10 to 40° C., more preferably in the range from 15 to 35° C. and especially preferably in the range from 20 to 30° C., particular preference still being given to room temperature.

Tetraalkylammonium Compound/Base

In addition to the at least one tetraalkylammonium compound comprising $R_1R_2R_3R_4N^+$, it is possible in accordance with the invention to use a base other than this compound. These include, for instance, ammonium hydroxide $NH_4OH$, alkali metal hydroxides or alkaline earth metal hydroxides, for instance sodium hydroxide or potassium hydroxide, or mixtures of two or more of these compounds. In this case, the tetraalkylammonium compound comprising at least one $R_1R_2R_3R_4N^+$ comprises one or more suitable anions, for example halogen anions, for example fluoride or chloride or bromide or iodide.

In a preferred embodiment, the tetraalkylammonium compound comprising at least one $R_1R_2R_3R_4N^+$ also comprises the base used in (1) as an anion. Basic anions in this context include the hydroxide ion or aluminates. A particularly preferred basic anion is the hydroxide ion.

Accordingly, the present invention also relates to a process as described above, wherein the at least one tetraalkylammonium compound comprising $R_1R_2R_3R_4N^+$ comprises a basic anion, preferably a hydroxide ion.

The present invention therefore likewise also relates to a process as described above, wherein the aqueous solution used in (1) comprises dimethyldi-n-propylammonium hydroxide (DMDPAH).

DMDPAH can be prepared by any conceivable process. One means of preparation is, for example, electrochemical dialysis by means of a membrane. In one embodiment of the process according to the invention, DMDPAH is obtained by reaction of dipropylamine and methyl iodide, and subsequent anion exchange. In a further embodiment, dipropylamine and methyl iodide are reacted with one another in a suitable solvent or solvent mixture, preferably in ethanol. The temperature at which this reaction is effected is preferably within the range from 20 to 75° C., more preferably within the range from 30 to 60° C. and especially preferably within the range from 40 to 50° C. In a further embodiment of the process according to the invention, DMDPAH can be prepared proceeding from dimethylamine and propyl bromide in a suitable solvent, for example and with preference ethanol, at a suitable temperature, for example and with preference of 40 to 50° C. The inventive anion exchange is effected, preferably after removal, for example by filtering, centrifuging or another solid-liquid separation process, for example and with preference by filtration, and washing, of the particular ammonium hydroxide, for example and with preference with a suitable alcohol, for example ethanol, by means of a suitable ion exchange resin, for example an Amberlyst™ resin or a resin of the AG1-X8 type (BioRad).

Also possible is ion exchange using $Ag_2O$. It is likewise possible to use commercially available DMDPAH in the process according to the invention, for example an aqueous DMDPAH solution from Sachem. DMDPAH is used in (i) preferably as a solution, especially preferably as an aqueous solution, the concentration of the aqueous solution based on DMDPAH being, for example, in the range from 10 to 20% by weight, preferably in the range from 15 to 20% by weight.

Silicon Dioxide:Tetraalkylammonium Compound:Water

The molar ratios of silicon dioxide and/or of the silicon dioxide which results from the precursor compound by hydrothermal synthesis in (2) in the silicate which is then obtained, tetraalkylammonium compound, especially tetraalkylammonium hydroxide compound and especially DMDPAH, and water can be set essentially as desired, provided that it is ensured that at least one silicate is obtained in (2) by crystallization.

In a preferred embodiment, the amounts of silicon dioxide used and/or silicon dioxide resulting from precursor, tetraalkylammonium hydroxide compound and water are selected such that the colloidal solution obtained in (1) comprises silicon dioxide, tetraalkylammonium hydroxide compound and water in weight ratios in the region of 1:(0.4-10):(4-12). In addition, with regard to the abovementioned ranges, water contents up to 15 are possible, an example of a lower limit being 3. Accordingly, the colloidal solution obtained in (1) may comprise silicon dioxide, tetraalkylammonium hydroxide compound and water in weight ratios in the region of 1:(0.4-10):(3-15). Moreover, in accordance with the invention, the water content may be in the range from 4 to 15 or from 5 to 15 or from 6 to 15 or from 7 to 15 or from 8 to 15 or from 9 to 15 or from 10 to 15 or from 11 to 15 or from 12 to 15 or from 13 to 15 or from 14 to 15 or from 3 to 14 or from 3 to 13 or from 3 to 12 or from 3 to 11 or from 3 to 10 or from 3 to 9 or from 3 to 8 or from 3 to 7 or from 3 to 6 or from 3 to 5 or from 3 to 4. Further preferred ranges are, for example from 4 to 14.5 or from 5 to 14 or from 6 to 13.5 or from 7 to 13 or from 7.5 to 12.5. The content of tetraalkylammonium hydroxide compound may, in accordance with the invention, for example, be in the range from 0.5 to 9 or from 0.6 to 8 or from 0.7 to 7 or from 0.8 to 6 or from 0.9 to 5 or from 1.0 to 4 or from 1.1 to 3 or from 1.2 to 2.

In a particularly preferred embodiment of the present invention, the colloidal solution obtained in (1) comprises $SiO_2$, DMDPAH and water in the $SiO_2$:DMDPAH:water weight ratios of 1:(0.4-10):(4-12), more preferably of 1:(0.5-8):(4-12), more preferably of 1:(0.6-6):(4-12), more preferably of 1:(0.8-4):(4-12), more preferably of 1:(1-2):(4-12), more preferably of 1:(1.1-1.5):(4-12), where the water content is in each case more preferably within the range of (5-12), more preferably within the range of (6-12), more preferably within the range of (7-12), more preferably within the range of (8-12), more preferably within the range of (9-12) and more preferably within the range of (10-12).

Accordingly, the colloidal solution which is obtained in (1) and is to be heated in (2) comprises $SiO_2$, DMDPAH and water more preferably in the $SiO_2$:DMDPAH:water weight ratios of 1:(1-2):(10-12).

Silicon Dioxide Source

In the context of the present invention, the silicon dioxide source used in (1) may in principle be any suitable compound, especially any suitable compound which either comprises silicon dioxide or from which silicon dioxide can be formed (silicon dioxide precursor). In this connection, mention should be made of colloidal silicon dioxide, of suitable silicone resins, of "wet process" silicon dioxide and of "dry process" silicon dioxide. In these cases, the silicon dioxide is most preferably amorphous silicon dioxide, the size of the silicon dioxide particles being, for example, in the range from 5 to 100 nm, and the surface area of the silicon dioxide particles being in the range from 50 to 500 $m^2/g$. Names under which colloidal silicon dioxide is commercially available include Ludox®, Syton®, Nalco® or Snowtex®. Names under which "wet process" silicon dioxide is commercially available include Hi-Sil®, Ultrasil®, Vulcasil®, Santocel®, Valron-Estersil®, Tokusil® or Nipsil®. Names under which "dry process" silicon dioxide is commercially available include Aerosil®, Reolosil®, Cab-O-Sil®, Fransil® or ArcSilica®. One example of a precursor compound is tetraalkyl orthosilicates. In the context of the present invention, preference is given to using amorphous silicon dioxide as the silicon dioxide source.

Accordingly, the present invention also relates to a process as described above, wherein the silicon dioxide source used in (1) is amorphous silicon dioxide.

It is possible here in principle to use any suitable amorphous silicon dioxide. Preference is given to amorphous silicon dioxide with a specific surface area (BET, Brunauer-Emmett-Teller; determined to DIN 66131 by nitrogen adsorption at 77 K) in the range from 10 to 400 $m^2/g$, preferably in the range from 10 to 100 $m^2/g$ and more preferably in the range from 10 to 50 $m^2/g$. Further preferred ranges are 50 to 100 $m^2/g$ or 100 to 300 $m^2/g$ or 300 to 400 $m^2/g$.

Heteroatom Source

When, in the context of one embodiment, a gallium source is used in (1) as the heteroatom source and, accordingly, in the course of the inventive preparation of the silicate, gallium is incorporated into the silicate lattice as a heteroatom, it is generally possible to use those gallium sources which, by virtue of their chemical properties in the colloidal solution in (1), when heated in the course of the hydrothermal crystallization in (2), enable the incorporation of Ga into the silicate lattice. In principle, according to the present invention, two or more suitable gallium sources can be used in (1). Especially preferably, in the context of the present invention, gallium nitrate is used as the gallium source.

When, in the context of one embodiment, a zinc source is used in (1) as the heteroatom source and, accordingly, in the course of the inventive preparation of the silicate, zinc is incorporated into the silicate lattice as a heteroatom, it is generally possible to use those zinc sources which, by virtue of their chemical properties in the colloidal solution in (1), when heated in the course of the hydrothermal crystallization in (2), enable the incorporation of Zn into the silicate lattice. In principle, according to the present invention, two or more suitable zinc sources can be used in (1). Especially preferably, in the context of the present invention, zinc nitrate is used as the zinc source.

In principle, the present invention also comprises embodiments in which a silicate which has both gallium and zinc in the silicate lattice is prepared. In this case, it is possible that both at least one suitable gallium source and at least one suitable zinc source are used in (1), particular preference being given to the use of gallium nitrate and zinc nitrate.

The present invention therefore also relates to a process as described above, wherein the heteroatom source used is gallium nitrate and/or zinc nitrate.

Crystallization Assistants

The crystallization assistant used may in principle be the sheet silicate of the preferred RUB-39 structure obtained in accordance with the invention from (2), which comprises Ga or Zn or Ga and Zn in the silicate lattice, or the framework silicate of the preferred RRO structure which is obtained in accordance with the invention as described below and comprises Ga or Zn or Ga and Zn in the silicate lattice, or a mixture of this sheet silicate and this framework silicate.

It is equally possible to use, as the crystallization assistant in (1), a sheet silicate whose structure corresponds to the sheet silicate obtained from (2), but comprises either no heteroatom or a heteroatom other than Ga and/or Zn. Moreover, it is possible to use, as the crystallization assistant in (1), a framework silicate whose structure differs from the framework silicate obtained in accordance with the invention as described below, but comprises either no heteroatom or a heteroatom other than Ga and/or Zn. It is equally possible to use a suitable mixture of at least one of these sheet silicates and at least one of these framework silicates.

Preferably, in the context of the present invention, the crystallization assistant used in (1) is a sheet silicate of the RUB-39 structure which comprises either no heteroatom or Ga and/or Zn as the heteroatom or a heteroatom other than Ga and/or Zn as the heteroatom, for example Al, B, Fe, Ti, Sn, Ge, Zr, V or Nb, or Ga and/or Zn as the heteroatom and additionally at least one further heteroatom, for example Al, B, Fe, Ti, Sn, Ge, Zr, V or Nb.

In the context of the present invention, particular preference is given to using a sheet silicate of the RUB-39 structure which does not comprise a heteroatom as the crystallization assistant in (1). Such a sheet silicate of the RUB-39 structure which does not comprise a heteroatom is referred to in the context of the present invention as Si-RUB-39.

The present invention therefore also relates to a process as described above, wherein the crystallization assistant used in (1) is a sheet silicate of the Si-RUB-39 structure.

Especially compared to a process in which no silicate of the RUB-39 structure was added as a crystallization assistant and for which crystallization times of about 15 to 45 days are typical—as described, for instance, in WO 2005/100242 A1 or in Wang et al.—it was possible by the process according to the invention, surprisingly, for the preparation of the Ga- and/or Zn-comprising silicates, to achieve a considerable shortening of the hydrothermal crystallization time to significantly less than 15 days, even to less than 10 days, for example to 7 to 9 days.

Accordingly, the present invention also relates to the use of a sheet silicate of the Si-RUB-39 structure as a crystallization assistant for shortening the crystallization time of the hydrothermal synthesis in the preparation of a Ga- and/or Zn-comprising silicate of the RUB-39 structure, preferably for shortening the crystallization time of the hydrothermal synthesis to less than 10 days, especially preferably to a period in the range from 7 to 9 days.

As far as the amount of crystallization assistant is concerned, there do not exist any restrictions in principle, provided that the inventive preparation of the silicate and especially the achieved advantage of short crystallization times of the hydrothermal synthesis are ensured.

For example and with preference, the silicate used as a crystallization assistant in (1) is added in an amount, based on silicon dioxide and/or on silicon dioxide present in the silicon dioxide precursor of up to 5% by weight, more preferably of 0.001 to 5% by weight, more preferably of 0.005 to 1% by weight, more preferably of 0.005 to 0.1% by weight and especially preferably of 0.01 to 0.05% by weight.

The present invention therefore also relates to a process as described above, wherein the crystallization assistant is added in (1), based on silicon dioxide and/or on silicon dioxide present in the silicon dioxide precursor, in an amount of 0.001 to 5% by weight, preferably of 0.01 to 0.05% by weight.

Preparation of the Sheet Silicate of the Si-RUB-39 Structure

In principle, with regard to the preparation of the sheet silicate of the Si-RUB-39 structure, there do not exist any restrictions. For example and with preference, Si-RUB-39 can be prepared as described in the Wang et al., Chem. Mater. 17, 2005 p. 43-49, already cited above. More particularly, in this connection, reference should be made to p. 44 of this scientific article, where the preparation of "as-synthesized RUB-39", which corresponds to the Si-RUB-39 of the present invention, is described in the right-hand column under the heading "Experimental" in the first two paragraphs of the "Synthesis" sub-heading. As far as the characterization of the Si-RUB-39 prepared according to Wang et al. is concerned, reference is made especially to FIGS. 1 to 4 of this article and the corresponding passages.

As a likewise preferred means of preparation, reference is made to the process disclosed in general terms in WO 2005/100242 A1 which has already been cited above, and there especially in Examples 1 and 2.

Colloidal Aqueous Solution Obtained in (1)

The solution obtained in step (1) of the process according to the invention, which is heated and subjected to a hydrothermal crystallization in (2), may in principle have any compositions, provided that it is ensured that the inventive silicate having Ga and/or Zn in the silicate lattice is obtained in (2).

Compositions preferred in accordance with the invention with regard to the weight ratios of silicon dioxide:tetraalkylammonium compound:water have already been described above.

In the case that a silicate comprising gallium as the heteroatom, especially a Ga-RUB-39, is prepared in (2) in accordance with the invention, the solution obtained in (1), before being heated in (2), comprises silicon, calculated as $SiO_2$, gallium, calculated as $Ga_2O_3$, DMDPAH as the tetraalkylammonium compound, water and crystallization assistant $SiO_2:Ga_2O_3$:DMDPAH:water:crystallization assistant
preferably in the weight ratios
1:(0.001-0.05):(0.4-10):(4-12):(0.001-5),
more preferably in the weight ratios
1:(0.002-0.04):(0.6-5):(6-12):(0.002-1),
more preferably in the weight ratios
1:(0.003-0.03):(0.8-3):(8-12):(0.005-0.1),
and especially preferably in the weight ratios
1:(0.005-0.02):(1-2):(10-12):(0.01-0.05).

In the case that a silicate comprising zinc as the heteroatom, especially a Zn-RUB-39, is prepared in (2) in accordance with the invention, the solution obtained in (1), before being heated in (2), comprises silicon, calculated as $SiO_2$, zinc, calculated as $Zn_2O_3$, DMDPAH as the tetraalkylammonium compound, water and crystallization assistant $SiO_2:Zn_2O_3$:DMDPAH:water:crystallization assistant
preferably in the weight ratios
1:(0.001-0.05):(0.4-10):(4-12):(0.001-5),
more preferably in the weight ratios
1:(0.002-0.05):(0.6-5):(6-12):(0.002-1),
more preferably in the weight ratios
1:(0.005-0.05):(0.8-3):(8-12):(0.005-0.1),
and especially preferably in the weight ratios
1:(0.01-0.05):(1-2):(10-12):(0.01-0.05).

It is optionally possible, should this be necessary, to suitably concentrate the solution obtained in (1), comprising silicon dioxide source, heteroatom source, tetraalkylammonium compound, base and crystallization assistant, before step (2) in order to have abovementioned compositions. In the context of the present invention, the concentrating can generally be achieved by means of all suitable methods, for example by means of application of a suitable reduced pressure or by means of heating to a particular suitable temperature, or else by means of a combination of these methods. For concentration in accordance with the invention, preference is given to heating the mixture obtained in (1), preferably at ambient pressure, to a suitable temperature at which the desired portion of the water present in the mixture is removed, such that the compositions specified above are achieved. The at least one suitable apparatus for concentration may include rotary evaporators or ovens. Particular preference is given to an oven. Preference is given in this regard to apparatuses including those which allow removal of water under reduced pressure and hence at low temperatures, for example rotary evaporators operated under reduced pressure. The mixture obtained in (1) can preferably be heated to temperatures in the range from 50 to 90° C., more preferably from 55 to 85° C., more preferably from 60 to 80° C. and especially preferably from 65 to 75° C., and kept at the appropriately selected temperature until the desired amount of water has been removed. In a preferred embodiment of the process according to the invention, the mixture is heated from preferably room temperature to the temperature selected for concentration with heating rates in the range from 0.1 to 12° C./h, more preferably of 1 to 11° C./h and especially preferably in the range from 5 to 10° C./h.

In further embodiments of the present invention, it is possible that the inventive silicate having Ga and/or Zn in the lattice has at least one further heteroatom. Examples here include aluminum, boron, iron, tin, germanium, zirconium, vanadium or niobium.

When, for example, aluminum is incorporated, the solution prepared in (1) may additionally comprise an aluminum source, for example metallic aluminum, for example aluminum powder, or suitable aluminates, for example alkali metal aluminates, and/or aluminum alkoxides, for example aluminum triisopropoxide. One preferred aluminum source used in the case of incorporation of aluminum is sodium aluminate.

When, for example, boron is incorporated, the solution prepared in (1) may additionally comprise a boron source, for example free boric acid and/or borates and/or boric esters, for instance triethyl borate or trimethyl borate. In the case of incorporation of boron, preference is given, for example, to boric acid as the boron source.

When, for example, tin is incorporated, the solution prepared in (1) may additionally comprise a tin source, for example tin chlorides and/or organometallic tin compounds, for instance tin alkoxides or chelates, for instance tin acetylacetonate.

When, for example, zirconium is incorporated, the solution prepared in (1) may additionally comprise a zirconium source, for example zirconium chloride and/or zirconium alkoxides.

When, for example, vanadium or germanium or niobium is incorporated, the solution prepared in (1) may additionally comprise a vanadium, germanium or niobium source, for example vanadium chloride or germanium chloride or niobium chloride.

Accordingly, the present invention also relates to a process as described above and to the silicates obtainable by this process, wherein the further heteroatom source used additionally in (1) is a heteroatom source selected from the group consisting of an aluminum source, a boron source, an iron source, a titanium source, a tin source, a germanium source, a zirconium source, a vanadium source, a niobium source and a mixture of two or more of these heteroatom sources.

According to the type of atoms which are incorporated into the lattice of the inventive silicate, a negatively charged framework may arise, which enables, for example, the silicate to be laden with cations. Cations which should be mentioned include the ammonium ions $R_1R_2R_3R_4N^+$ of the template compounds, platinum cations, palladium cations, rhodium cations or ruthenium cations, gold cations, alkali metal cations, for example sodium or potassium ions, or alkaline earth metal cations, for example magnesium or calcium ions. In this connection, mention should likewise be made, for example, of molybdenum, tungsten, rhenium or silver. For instance, firstly the silicates of the RUB-39 structure prepared in accordance with the invention and/or the silicates of the RRO structure (RUB-41) described below are loadable.

Hydrothermal Crystallization in Step (2)

The mixture obtained in (1) is, optionally after concentration, subjected in accordance with the invention to a hydrothermal crystallization in (2). This affords a silicate, especially a sheet silicate of the Ga-RUB-39 or Zn-RUB-39 or Ga/Zn-RUB-39 structure, which comprises Ga and/or Zn as the heteroatom in the silicate lattice and which is obtained in the form of primary crystals suspended in the mother liquor.

In principle, it is possible to heat the solution obtained in (1), in (2), under any suitable pressure at any suitable temperature, provided that it is ensured that the silicate, especially the silicate of the RUB-39 structure, crystallizes in the colloidal solution. Preference is given here to temperatures which are above the boiling point of the mixture obtained in (1) at the selected pressure. More preferred are temperatures up to 180° C. at standard pressure. In a particularly preferred embodiment of the process according to the invention, the crystallization in (2) is performed in an autoclave.

The term "standard pressure" as used in the context of the present invention refers to a pressure of ideally 101 325 Pa which, however, may be subject to variations within limits known to those skilled in the art. For example, the pressure may be within the range from 95 000 to 106 000 or from 96 000 to 105 000 or 97 000 to 104 000 or from 98 000 to 103 000 or from 99 000 to 102 000 Pa.

The temperature used in (2) in the autoclave is preferably in the range from 100 to 180° C., more preferably in the range from 110 to 175° C., more preferably in the range from 120 to 170° C., more preferably in the range from 130 to 165° C. and especially preferably in the range from 140 to 160° C.

This temperature, to which the colloidal solution obtained in (1) is heated in (2), can in principle be maintained until the crystallization has proceeded to the desired degree. Preference is given here to times of up to 360 h, more preferably of up to 300 h, more preferably of up to 240 h, more preferably of 12 h to 240 h, more preferably of 24 h to 240 h, more preferably of 120 h to 240 h, more preferably of 144 h to 240 h and more preferably of 168 h to 216 h.

Especially preferred is, for example, a hydrothermal crystallization in the range from 168 h to 216 h at a temperature in the range from 140 to 160° C.

For the crystallization in (2), the solution is preferably suitably stirred. It is equally possible to suitably rotate the reaction vessel in which the crystallization is performed.

Compared to a process in which no silicate of the RUB-39 structure was added as a crystallization assistant and for which crystallization times of about 15 to 45 days are typical, the process according to the invention in which novel Ga- and/or Zn-comprising silicates are obtained achieved a considerable shortening of the crystallization time to significantly less than 15 days, even to less than 10 days, for example crystallization times of 7 to 9 days.

Accordingly, the present invention also relates to a process as described above, wherein the solution obtained in (1) is hydrothermally crystallized in (2) for a period in the range from 7 to 9 days.

Workup

In one embodiment of the process according to the invention, the crystallization in (2) can be stopped by suitable quenching. In this context, it is particularly preferred to admix the suspension with water which has a temperature suitable for stopping the crystallization.

In one embodiment of the process according to the invention, the at least one silicate is removed from the suspension obtained from (2) in a suitable manner in at least one step. This removal can be effected, for example, by means of filtration, ultrafiltration, diafiltration, centrifugation processes, or, for instance, spray-drying and spray-granulation processes. Preference is given to removal by means of spray drying or filtration. The removal, for example, by means of spray processes may proceed from the suspension obtained in (2) as such, or from a suspension which results from a concentration of the suspension obtained in (2). This concentration can be effected, for example, by means of evaporative concentration, for example evaporative concentration under reduced pressure, or by means of cross-flow filtration. It is equally possible to concentrate the suspension obtained in (2) by dividing the suspension obtained in (2) and removing the solid present in one of the two parts by, for example, filtration, ultrafiltration, diafiltration or centrifugation processes, and, after a possible washing and/or drying step, suspending it in the other part of the suspension. The sprayed material obtained by means of the removal and drying processes of spray-drying and spray-granulation drying, for example fluidized bed spray-granulation drying, may comprise solid and/or hollow spheres or consist essentially of such spheres, which may, for example, have a diameter in the range from 5 to 500 µm or else 5 to 300 µm. The atomizer nozzles used in the spraying process may, for example, be one-substance or multisubstance nozzles. Also conceivable is the use of a rotary atomizer. Possible entrance temperatures of the carrier gas used are, for example, in the range from 200 to 600° C., preferably in the range from 225 to 550° C. and more preferably in the range from 300 to 500° C. The exit temperature of the carrier gas is, for example, in the range from 50 to 200° C. Examples of carrier gases include air, lean air or oxygen-nitrogen mixtures with an oxygen content of up to 10% by volume, preferably of up to 5% by volume, more preferably of less than 5% by volume, for example of up to 2% by volume. The spraying processes can be performed in countercurrent or in cocurrent.

Accordingly, the present invention also relates to a process as described above, additionally comprising (3) removing the at least one silicate comprising silicon, oxygen and at least one heteroatom from the suspension obtained in (2).

The at least one silicate removed as described above is, in a preferred embodiment of the process according to the invention, washed and/or dried.

Accordingly, the present invention also relates to the process as described above, additionally comprising (4) washing and/or (5) drying of the silicate obtained in (3).

The removal may be followed by at least one washing step and/or at least one drying step, it being possible to use identical or different washing agents or washing agent mixtures in at least two washing steps and identical or different drying temperatures in at least two drying steps.

The drying temperatures here are preferably in the range from room temperature to 150° C., more preferably from 60 to 140° C., more preferably from 80 to 130° C. and more preferably in the range from 100 to 120° C.

The drying times are preferably in the range from 6 to 48 h, more preferably from 12 to 36 h.

The present invention accordingly also relates to the process as described above, wherein the silicate is washed with water in (4) and/or dried at a temperature in the range from room temperature to 150° C. in (5).

The washing compositions used may, for example, be water, alcohols, for example methanol, ethanol or propanol, or mixtures of two or more thereof. Examples of mixtures include mixtures of two or more alcohols, for example methanol and ethanol or methanol and propanol or ethanol and propanol or methanol and ethanol and propanol, or mixtures of water and at least one alcohol, for example water and methanol or water and ethanol or water and propanol or water and methanol and ethanol or water and methanol and propanol or water and ethanol and propanol or water and methanol and ethanol and propanol. Preference is given to water or a mixture of water and at least one alcohol, preferably water and ethanol, very particular preference being given to water as the sole washing agent.

In one embodiment of the process according to the invention, the mother liquor which is obtained from the removal of the at least one silicate in (3) and which comprises any unconverted reactants is recycled into step (1) of the process.

The above-described removal, for example by a spray-drying or spray-granulation process, has the advantage that the removal of the silicate from the suspension obtained in (2) and the drying of the silicate can be performed in a single step.

The present invention therefore also relates to a process as described above, additionally comprising (3) removing the at least one silicate comprising silicon, oxygen and at least one heteroatom from the suspension obtained in (2), (4) optionally washing the silicate removed in (3), preferably washing with water, (5) drying the silicate obtained in (3) or (4), preferably at a temperature in the range from room temperature to 150° C.

Sheet Silicate of the RUB-39 Structure

In the process according to the invention, a silicate, especially a sheet silicate of the RUB-39 structure, is obtained.

The sheet silicate of the RUB-39 structure comprising Ga and/or Zn, which is especially obtained in accordance with the invention, is notable in that, in the corresponding x-ray diffraction pattern by means of Cu K alpha 1 radiation, at least the following reflections occur:

| Intensity (%) | Diffraction angle 2θ/° [Cu K(alpha 1)] |
|---|---|
| 100 | 8.0-8.4 |
| 11-21 | 11.0-11.4 |
| 13-23 | 13.2-13.6 |
| 5-15 | 18.0-18.4 |
| 7-17 | 18.4-18.8 |
| 19-29 | 19.9-20.0 | where the 100% figure relates to the intensity of the highest peak in the x-ray diffractogram.

Accordingly, the present invention also relates to a sheet silicate, especially a sheet silicate of the RUB-39 structure, and especially a sheet silicate of the RUB-39 structure, comprising Ga and/or Zn in the silicate lattice, which has, in the x-ray diffraction pattern by means of Cu K alpha 1 radiation, at least the following reflections:

| Intensity (%) | Diffraction angle 2θ/° [Cu K(alpha 1)] |
|---|---|
| 100 | 8.0-8.4 |
| 11-21 | 11.0-11.4 |
| 13-23 | 13.2-13.6 |
| 5-15 | 18.0-18.4 |
| 7-17 | 18.4-18.8 |
| 19-29 | 19.9-20.0 | where the 100% figure relates to the intensity of the highest peak in the x-ray diffractogram, the sheet silicate being obtainable by the above-described process according to the invention.

More particularly, the present invention relates to a sheet silicate of the RUB-39 structure, comprising Ga and/or Zn in the silicate lattice, which has, in the x-ray diffraction pattern by means of Cu K alpha 1 radiation, at least the following reflections:

| Intensity (%) | Diffraction angle 2θ/° [Cu K(alpha 1)] |
|---|---|
| 100 | 8.0-8.4 |
| 11-21 | 11.0-11.4 |
| 13-23 | 13.2-13.6 |
| 5-15 | 18.0-18.4 |
| 7-17 | 18.4-18.8 |
| 19-29 | 19.8-20.2 |
| 20-30 | 22.0-22.35 |
| 6-16 | 22.36-22.7 |
| 23-33 | 23.3-23.59 |
| 22-32 | 23.60-23.8 | where the 100% figure relates to the intensity of the highest peak in the x-ray diffractogram.

Framework Silicate of the RRO Structure

In a further embodiment of the present invention, in (6), the resulting sheet silicate of the RUB-39 structure, comprising Ga and/or Zn in the silicate lattice, is calcined in at least one additional step.

It is possible in principle to feed the suspension comprising the at least one silicate directly to the calcination. Preferably, the silicate, before the calcination, is removed from the suspension in (3) as described above.

Before the calcination, the silicate removed from the suspension can be subjected to at least one washing step (4) as described above and/or at least one drying step (5) as described above. The silicate removed from the suspension is preferably dried and sent to the calcination without a washing step.

The calcination in (6) of the silicate obtained in (2) and/or (3) and/or (4) and/or (5) is effected preferably at a temperature in the range up to 600° C. to obtain a framework silicate.

In a preferred embodiment of the process according to the invention, the silicate is heated here from room temperature to a temperature of up to 600° C., the heating rate more preferably being in the range from 0.1 to 12° C./h, more preferably from 1 to 11° C./h and especially preferably in the range from 5 to 10° C./h.

For example and with preference, this temperature is in the range from 200 to 600° C. Particular preference is given to calcination temperatures in the range from 300 to 600° C. Further preferred are calcination temperatures in the range from 400 to 575° C., especially preferably in the range from 450 to 550° C.

In one possible configuration of the process according to the invention, the calcination is performed in temperature stages. The term "in temperature stages" as used in the context of the present invention refers to a calcination in which the silicate to be calcined is heated to a particular temperature, kept at this temperature for a particular time, and heated from this temperature to at least one further temperature, and is kept there again for a certain time.

The silicate to be calcined is preferably kept at up to 4 temperatures, more preferably at up to 3 temperatures and especially preferably at 2 temperatures.

In this regard, the first temperature is preferably in the range from 500 to 540° C., more preferably in the range from 505 to 535° C., more preferably in the range from 510 to 530° C. and especially preferably in the range from 515 to 525° C. This temperature is preferably maintained for a period in the range from 8 to 24 h, more preferably from 9 to 18 h and especially from 10 to 14 hours.

The second temperature is preferably in the range from greater than 540 to 600° C., more preferably in the range from 550 to 580° C. and especially preferably in the range from 555 to 570° C. This temperature is preferably maintained for a period in the range from 0.5 to 6 h, more preferably from 1 to 4 h and especially from 1 to 3 hours.

Accordingly, the present invention also relates to a process as described above, wherein the calcination is effected in temperature stages in the range of up to 600° C., preferably from 300 to 600° C.

The calcination can be effected in any suitable atmosphere, for example air, lean air, nitrogen, water vapor, synthetic air, carbon dioxide. The calcination is preferably effected under air.

The calcination can be performed in any apparatus suitable therefor. Preference is given to effecting the calcination in a rotary tube, in a belt calciner, in a muffle furnace, in situ in an apparatus in which the silicate is used at a later time as intended, for example as a molecular sieve, as a catalyst or for another application described below. Especially preferred here are rotary tubes and belt calciners.

In a further possible embodiment of the present invention, in which the silicate obtained in (2) is preferably removed from the suspension by means of spray-drying or spray-granulation processes, the conditions under which the removal is performed are selected such that, during the removal, at least a portion of the sheet silicate is converted to the framework silicate. Preference is given to selecting temperatures which are at least 225° C. during the removal. This process variant gives the advantage that the steps of removal, drying and at least partial calcining can be combined in a single step.

In the process according to the invention, after the calcination, a silicate, especially a framework silicate of the RRO structure (RUB-41), is obtained.

Accordingly, the present invention also relates to the process as described above, additionally comprising (6) calcining the at least one silicate which comprises silicon, oxygen and at least one heteroatom and is obtained in (5), preferably at a temperature in the range from 300 to 600° C., to obtain a framework silicate, preferably a framework silicate assigned by x-ray crystallography to the RRO type.

Accordingly, the present invention also relates to a silicate, especially to a framework silicate of the RRO structure, comprising Ga and/or Zn in the silicate lattice, obtainable by the above-described process, comprising the calcination in (6).

The present invention likewise relates to a framework silicate of the RRO structure, comprising Ga and/or Zn in the silicate lattice, which especially has, in the x-ray diffraction pattern by means of Cu K alpha 1 radiation, at least the following reflections:

| Intensity/% | Diffraction angle 2θ/° [Cu K(alpha 1)] |
|---|---|
| 100 | 9.8-10.2 |
| 24-34 | 11.0-11.4 |
| 9-19 | 15.5-15.9 |
| 12-22 | 19.4-19.6 |
| 19-29 | 19.6-19.8 | where the 100% figure relates to the intensity of the highest peak in the x-ray diffractogram.

More particularly, the present invention relates to the framework silicate of the RRO structure, comprising Ga and/or Zn in the silicate lattice, which especially has, in the x-ray diffraction pattern by means of Cu K alpha 1 radiation, at least the following reflections:

| Intensity/% | Diffraction angle 2θ/° [Cu K(alpha 1)] |
|---|---|
| 100 | 9.8-10.2 |
| 24-34 | 11.0-11.4 |
| 9-19 | 15.5-15.9 |
| 12-22 | 19.4-19.6 |
| 19-29 | 19.6-19.8 |
| 8-18 | 26.2-<26.3 |
| 8-18 | 26.3-<26.4 |
| 13-23 | 26.4-26.6 | where the 100% figure relates to the intensity of the highest peak in the x-ray diffractogram.

The inventive framework silicates, or those prepared in accordance with the invention, are preferably present in the P2/c space group. In the case that the reactants used, as described above, were tetraalkylammonium hydroxide and silicon dioxide and/or silicon dioxide precursor, the framework silicates prepared in accordance with the invention preferably have the following lattice parameters, determined by means of Rietveld analysis:

a=7.34(1) Å
b=8.72(1) Å
c=17.17(1) Å
beta=114.2(1)°

According to 29-Si MAS NMR spectroscopy, the low-field signal at about 104 ppm, which is characteristic of a silanol group typical of a sheet silicate, which is found in the case of the above-described inventive sheet silicates is absent in the case of the inventive framework silicates.

The inventive framework silicates preferably have 8-MR and 10-MR channels, the 8-MR channels especially preferably running parallel to c of the unit cell, as specified above, and the 10-MR channels especially preferably running parallel to a of the unit cell as specified above. For the definition of the 8-MR and 10-MR channels, reference is made to Ch. Baerlocher, W. M. Meier, D. H. Olson, Atlas of Zeolite Framework Types, 5$^{th}$ edition, 2001, Elsevier, pages 10-15.

More particularly, the inventive framework silicates are notable for an essentially monomodal distribution with regard to the two-dimensional 8-MR and 10-MR channel pore structure. The pore openings both of the 8-MR channels and of the 10-MR channels in this regard preferably each have an area within the range of $(5.70-6.00)\times(4.00-4.20)$ Å$^2$, more preferably of $(5.80-5.90)\times(4.05-4.15)$ Å$^2$.

The inventive framework silicates preferably have micropores with a specific surface area in the range of greater than 200 m$^2$/g, more preferably of greater than 200 to 800 m$^2$/g, more preferably of 300 to 700 m$^2$/g and especially preferably of 400 to 600 m$^2$/g, in each case determined to DIN 66135 (Langmuir).

The inventive framework silicates preferably have pores with a pore volume in the range from 0.15 to 0.21 ml/g, more preferably of 0.16 to 0.20 ml/g and especially preferably of 0.17 to 0.19 ml/g, in each case determined to DIN 66134.

Accordingly, the inventive framework silicates are silicates of a microporous zeolitic type.

The thermal stability of the inventive framework silicates is preferably at least 600° C., more preferably more than 600° C.

The term "thermal stability" as used in this connection in the context of the present invention refers to that temperature at which the specific lattice structure of the framework silicate is preserved under standard pressure.

Shaped Body

In many industrial applications, it is often desired on the part of the user not to use the crystalline material, for example the sheet silicate or the framework silicate, itself, but instead the crystalline material which has been processed to shaped bodies. Such shaped bodies are needed specifically in many industrial scale processes, in order, for example, to be able to viably conduct removals of substances from substance mixtures in, for example, tubular reactors.

Accordingly, the present invention also relates to a shaped body comprising the above-described crystalline framework silicate. Also encompassed by the present invention are shaped bodies comprising the above-described sheet silicate.

Generally, the shaped body may comprise, as well as the inventive framework silicate, all conceivable further compounds, provided that it is ensured that the resulting shaped body is suitable for the desired application.

In one embodiment, the inventive shaped body is produced without using a binder by one of the shaping processes described below. The term "binder" as used in this connection in the context of the present invention refers to a binder which, after the calcination, described below, of the shaped body, remains in the shaped body either in its original form or in converted form.

In the context of the present invention, it is preferred that at least one suitable binder is used in the production of the shaped body. In this preferred embodiment, a mixture of framework silicate and the at least one binder is more preferably prepared.

Accordingly, the present invention also relates to a process for producing a shaped body comprising a framework silicate as described above, comprising the preparation of a framework silicate by the above-described process and the step of (i) preparing a mixture comprising the framework silicate as described above or a framework silicate obtainable by a process as described above, and at least one binder.

Suitable binders are generally all compounds which impart adhesion and/or cohesion between the particles of the framework silicate to be bound which goes beyond any physisorption present without binders. Examples of such binders are, for instance, metal oxides, for example $SiO_2$, $Al_2O_3$, $TiO_2$, $ZrO_2$ or MgO, or clays, or mixtures of two or more of these compounds.

Preferred $Al_2O_3$ binders are especially clay minerals and naturally occurring or synthetic aluminum oxides, for example alpha-, beta-, gamma-, delta-, eta-, kappa-, chi- or theta-aluminum oxide, and the inorganic or organometallic precursor compounds thereof, for example gibbsite, bayerite, boehmite, pseudoboehmite or trialkoxyaluminates, for example aluminum triisopropoxide. Further preferred binders are amiphilic compounds with polar and nonpolar moieties, and graphite. Further binders are, for instance, clays, for instance montmorillonites, kaolins, metakaolins, hectorite, bentonites, halloysites, dickites, nacrites or anaxites.

These binders can be used as such. Equally, it is also possible in the context of the present invention to use compounds from which the binder is formed in at least one further step in the course of preparation of the shaped bodies. Examples of such binder precursors are, for instance, tetraalkoxysilanes, tetraalkoxytitanates, tetraalkoxyzirconates or a mixture of two or more different tetraalkoxysilanes or a mixture of two or more different tetraalkoxytitanates or a mixture of two or more different tetraalkoxyzirconates or a mixture of at least one tetraalkoxysilane and at least one tetraalkoxytitanate or of at least one tetraalkoxysilane and at least one tetraalkoxyzirconate or of at least one tetraalkoxytitanate and at least one tetraalkoxyzirconate or a mixture of at least one tetraalkoxysilane and at least one tetraalkoxytitanate and at least one tetraalkoxyzirconate.

Very particular preference is given in the context of the present invention to binders which consist either completely or partly of $SiO_2$ or a precursor to $SiO_2$, from which $SiO_2$ is formed in at least one further step in the course of preparation of the shaped bodies. In this connection, it is possible to use colloidal silicon dioxide or "wet process" silicon dioxide or "dry process" silicon dioxide. In these cases, the silicon dioxide is most preferably amorphous silicon dioxide, the size of the silicon dioxide particles being, for example, in the range from 5 to 100 nm and the surface area of the silicon dioxide particles in the range from 50 to 500 $m^2/g$.

Colloidal silicon dioxide, preferably as an alkaline and/or ammoniacal solution, more preferably as an ammoniacal solution, is commercially available, for instance, under names including Ludox®, Syton®, Nalco® or Snowtex®.

"Wet process" silicon dioxide is commercially available, for instance, under names including Hi-Sil®, Ultrasil®, Vulcasil®, Santocel®, Valron-Estersil®, Tokusil® or Nipsil®.

"Dry process" silicon dioxide is commercially available, for instance, under names including Aerosil®, Reolosil®, Cab-O-Sil®, Fransil® or ArcSilica®.

In the context of the present invention, one preferred substance is an ammoniacal solution of colloidal silicon dioxide.

Accordingly, the present invention also relates to a shaped body as described above, additionally comprising $SiO_2$ as a binder.

The present invention likewise also relates to a process as described above, wherein the binder used in (I) is an $SiO_2$—comprising or—forming binder.

Accordingly, the present invention also relates to a process as described above, wherein the binder is a colloidal silicon dioxide.

The binders are preferably used in an amount which leads to ultimately resulting shaped bodies whose binder content is in the range of up to 80% by weight, more preferably in the range from 5 to 80% by weight, more preferably in the range from 10 to 70% by weight, more preferably in the range from 10 to 60% by weight, more preferably in the range from 15 to 50% by weight, more preferably in the range from 15 to 45% by weight and especially preferably in the range from 15 to 40% by weight, based in each case on the total weight of the ultimately resulting shaped body.

The term "ultimately resulting shaped body" as used in the context of the present invention refers to a shaped body as obtained from the drying and calcination stages (IV) and/or (V), preferably (IV) and (V) and especially preferably (V), as described below.

The mixture of binder or precursor to a binder and the zeolitic material can, for further processing and for formation of a plastic material, be admixed with at least one further compound. Preferred compounds here include pore formers.

The pore formers used in the process according to the invention may be all compounds which, with regard to the finished shaped body, provide a particular pore size and/or a particular pore size distribution and/or particular pore volumes.

Preference is given to using, as pore formers in the process according to the invention, polymers which are dispersible, suspendable or emulsifiable in water or in aqueous solvent mixtures. Preferred polymers here are polymeric vinyl compounds, for example polyalkylene oxides such as polyethylene oxides, polystyrene, polyacrylates, polymethacrylates, polyolefins, polyamides and polyesters, carbohydrates, for instance cellulose or cellulose derivatives, for example methylcellulose, or sugar or natural fibers. Further suitable pore formers are, for instance, pulp or graphite.

When, in the course of preparation of the mixture in (I), pore formers are used, the content in the mixture in (I) of pore formers, preferably polymer, is preferably in the range from 5 to 90% by weight, preferably in the range from 15 to 75% by weight and more preferably in the range from 25 to 55% by weight, based in each case on the amount of inventive framework silicate in the mixture in (I).

Should this be desired for the pore size distribution to be achieved, it is also possible to use a mixture of two or more pore formers.

In a particularly preferred embodiment of the process according to the invention, as described below, the pore formers are removed in a step (V) by calcination to obtain the porous shaped body. In a preferred embodiment of the process according to the invention, this affords shaped bodies which have pores, determined to DIN 66134, in the range of at least 0.6 ml/g, preferably in the range from 0.6 to 0.8 ml/g and especially preferably in the range from more than 0.6 ml/g to 0.8 ml/g.

The specific surface area of the inventive shaped body, determined to DIN 66131, is generally at least 350 $m^2/g$, preferably at least 400 $m^2/g$ and especially preferably at least 425 $m^2/g$. For example, the specific surface area may be in the range from 350 to 500 m²/g or in the range from 400 to 500 m²/g or 425 to 500 m²/g.

Accordingly, the present invention also relates to a shaped body as described above with a specific surface area of at least 350 m²/g, comprising pores with a pore volume of at least 0.6 ml/g.

In the course of preparation of the mixture in (I), in a likewise preferred embodiment of the process according to the invention, at least one pasting agent is added.

The pasting agents used may be all compounds suitable therefor. These are preferably organic, especially hydrophilic polymers, for example cellulose, cellulose derivatives, for example methylcellulose, starch, for example potato starch, wallpaper paste, polyacrylates, polymethacrylates, polyvinyl alcohol, polyvinylpyrrolidone, polyisobutene or polytetrahydrofuran.

More particularly, the pasting agents used may accordingly be compounds which also act as pore formers.

In a particularly preferred embodiment of the process according to the invention, as described below, these pasting agents are removed in a step (V) by calcining to obtain the porous shaped body.

In a further embodiment of the present invention, in the course of preparation of the mixture in (I), at least one acidic additive is used. Very particular preference is given to organic acidic compounds which can be removed by calcination in the preferred step (V), as described below. Particular preference is given to carboxylic acids, for example formic acid, oxalic acid, and/or citric acid. It is equally possible to use two or more of these acidic compounds.

The sequence of addition of the constituents of the mixture comprising the framework silicate in (I) is not critical. It is possible either first to add the at least one binder, then the at least one pore former, the at least one acidic compound and finally the at least one pasting agent, or else to alter the sequence with regard to the at least one binder, the at least one pore former, the at least one acidic compound and the at least one pasting agent.

After the addition of the binder to the framework silicate solid, to which at least one of the above-described compounds has optionally already been added, the mixture is homogenized in (I) generally for 10 to 180 minutes. For the homogenization, particular preference is given to using apparatus including kneaders, pan grinders or extruders. Preference is given to kneading the mixture. On the industrial scale, preference is given to pan grinding for homogenization.

Accordingly, the present invention also relates to a process for producing a shaped body comprising a framework silicate as described above, comprising the preparation of a framework silicate by the above-described process, and the steps of
(I) preparing a mixture comprising the framework silicate as described above or a framework silicate obtainable by a process as described above, and at least one binder material;
(II) kneading the mixture.

The homogenization generally works at temperatures in the range from about 10° C. up to the boiling point of the pasting agent and standard pressure or slightly superatmospheric pressure. Thereafter, it is optionally possible to add at least one of the above-described compounds. The mixture thus obtained is homogenized, preferably kneaded, until an extrudable plastic material has formed.

In a further preferred embodiment of the present invention, the homogenized mixture is shaped.

In the context of the present invention, for the processes in the shaping step, preference is given to those processes in which the shaping is effected by extrusion in customary extruders, for example to give extrudates with a diameter of preferably 1 to 10 mm and more preferably 2 to 5 mm. Such extrusion apparatus is described, for example, in Ullmann's Enzyklopädie der Technischen Chemie, 4$^{th}$ edition, Vol. 2, p. 295 ff., 1972. In addition to the use of an extruder, preference is likewise given to using a strand press for shaping.

In principle, however, it is possible to use all known and/or suitable kneading and shaping apparatus or processes for the shaping. These include:
(a) briquetting, i.e. mechanical pressing with or without addition of additional binder material;
(b) pelletizing, i.e. compacting by circular and/or rotating motions;
(c) sintering, i.e. the material to be shaped is subjected to a thermal treatment;
(d) hot isostatic pressing.

For example, the shaping can be selected from the following group, explicitly including the combination of at least two of these methods: briquetting by plunger pressing, roller pressing, annular roller pressing, briquetting without binder; pelletizing, melting, spinning techniques, deposition, foaming, spray-drying; firing in a shaft furnace, convection furnace, moving grate, rotary tube furnace, pan grinding.

The compaction may take place at ambient pressure or at elevated pressure relative to ambient pressure, for example within a pressure range from 1 bar to several hundred bar. Moreover, the compacting may take place at ambient temperature or at elevated temperature relative to ambient temperature, for example within a temperature range from 20 to 300° C. When drying and/or firing is part of the shaping step, temperatures up to 600° C. are conceivable. Finally, the compacting may take place in the ambient atmosphere or in a controlled atmosphere. Controlled atmospheres are, for example, protective gas atmospheres, reducing atmospheres and/or oxidizing atmospheres.

Accordingly, the present invention also relates to a process for producing a shaped body comprising a framework silicate as described above, comprising the preparation of a framework silicate by the above-described process and the steps of
(I) preparing a mixture comprising the framework silicate as described above or a framework silicate obtainable by a process as described above, and at least one binder material;
(II) kneading the mixture;
(III) shaping the kneaded mixture to obtain at least one shaped body.

The shape of the shaped bodies produced in accordance with the invention may be selected as desired. In particular, shapes including spheres, oval shapes, cylinders or tablets are possible. Mention should likewise be made of hollow structures, for example hollow cylinders or honeycomb-like structures, or else star-shaped geometries.

In the context of the present invention, particular preference is given to performing the shaping by extrusion of the kneaded mixture obtained in (II) to obtain, as extrudates, more preferably essentially cylindrical extrudates with a diameter in the range from 1 to 20 mm, preferably in the range from 1 to 10 mm, more preferably in the range from 2 to 10 mm and more preferably within the range from 2 to 5 mm.

In the context of the present invention, step (III) is preferably followed by at least one drying step. This at least one drying step is effected at temperatures in the range from generally 80 to 160° C., preferably from 90 to 145° C. and more preferably from 100 to 130° C., the drying time being generally 6 h or more, for example in the range from 6 to 24 h. However, depending on the moisture content of the material to be dried, shorter drying times, for example about 1, 2, 3, 4 or 5 h, are also possible.

Before and/or after the drying step, the extrudate obtained with preference can, for example, be comminuted. This preferably affords a granule or spall with a particle diameter of 0.1 to 5 mm, especially 0.5 to 2 mm.

Accordingly, the present invention also relates to a process for producing a shaped body comprising a framework silicate as described above, comprising the preparation of a framework silicate by the above-described process and the steps of (I) preparing a mixture comprising the framework silicate as described above or a framework silicate obtainable by a process as described above, and at least one binder material;
(II) kneading the mixture;
(III) shaping the kneaded mixture to obtain at least one shaped body;
(IV) drying the at least one shaped body.

In the context of the present invention, step (IV) is preferably followed by at least one calcination step. The calcination is performed at temperatures in the range from generally 350 to 750° C. and preferably from 450 to 600° C.

The calcination can be effected under any suitable gas atmosphere, preference being given to air and/or lean air. Moreover, the calcination is preferably performed in a muffle furnace, a rotary tube furnace and/or a belt calcining furnace, the calcination time being generally 1 h or more, for example in the range from 1 to 24 h or in the range from 3 to 12 h. Accordingly, it is possible, for example, in the context of the process according to the invention to calcine the shaped body once, twice or more than twice for at least 1 h in each case, for example in the range from 3 to 12 h in each case, in the course of which the temperatures may remain the same or be changed continuously or discontinuously during a calcination step. When calcination is effected twice or more than twice, the calcination temperatures in the individual steps may be different or the same.

Accordingly, the present invention also relates to a process for producing a shaped body comprising a framework silicate as described above, comprising the preparation of a framework silicate by the above-described process and the steps of (I) preparing a mixture comprising the framework silicate as described above or a framework silicate obtainable by a process as described above, and at least one binder material;
(II) kneading the mixture;
(III) shaping the kneaded mixture to obtain at least one shaped body;
(IV) drying the at least one shaped body;
(V) calcining the at least one dried shaped body.

After the calcination step, the calcined material can, for example, be comminuted. This preferably affords a granule or spall with a particle diameter of 0.1 to 5 mm, especially 0.5 to 2 mm.

Before and/or after the drying and/or before and/or after the calcination, the at least one shaped body can optionally be treated with a concentrated or dilute Brønsted acid or a mixture of two or more Brønsted acids. Suitable acids are, for example, hydrochloric acid, sulfuric acid, phosphoric acid, nitric acid or carboxylic acids, dicarboxylic acids or oligo- or polycarboxylic acids, for example nitrilotriacetic acid, sulfosalicylic acid or ethylenediaminetetraacetic acid.

Optionally, this at least one treatment with at least one Brønsted acid is followed by at least one drying step and/or at least one calcination step, each of which is performed under the conditions described above.

In a further embodiment of the process according to the invention, the shaped bodies obtained in accordance with the invention, for better curing, can be subjected to a water vapor treatment, which is preferably followed once again by at least one drying step and/or at least one calcination step. For example, at least one drying step and at least one subsequent calcination step are followed by subjecting the calcined shaped body to water vapor treatment and then once again by at least one drying step and/or at least one calcination step.

The shaped bodies obtained in accordance with the invention may have hardnesses which are in the range from 1 to 20 N, for example from 2 to 15 N, preferably in the range from 5 to 15 N and more preferably in the range from 10 to 15 N.

In the context of the present invention, the above-described hardness is understood to mean that determined on a Zwick BZ2.5/TS1S apparatus with an initial force of 0.5 N, an initial force advance rate of 10 mm/min and a subsequent test rate of 1.6 mm/min. The instrument possessed a fixed turntable and a freely movable die with a built-in blade of thickness 0.3 mm. The movable die with the blade was connected to a load cell to record the force and, during the measurement, moved toward the fixed turntable on which the shaped catalyst body to be analyzed lay. The test instrument was controlled by means of a computer which registered and evaluated the test results. The values achieved constitute the mean from the measurements for 10 shaped catalyst bodies in each case. The shaped catalyst bodies have a cylindrical geometry, and their mean length corresponded to about two to three times the diameter, and were subjected to the blade of thickness 0.3 mm with increasing force until the shaped body was severed. The blade was applied to the shaped body at right angles to the longitudinal axis of the shaped body. The force required for this purpose is the cutting hardness (unit N).

In the context of the present invention, it is also conceivable that an inventive shaped body is produced proceeding from the sheet silicate obtained in accordance with the invention. This can be used in the step (I) described above in connection with the use of the framework silicate either instead of the framework silicate or together with the framework silicate.

It is conceivable firstly that the sheet silicate, before the use in (I) as described above, is removed in (3) from the suspension which results from the hydrothermal synthesis, in which case, before use in (I), washing and/or drying in (4)/(5) may follow.

Secondly, it is conceivable that, before use in (I), the sheet silicate is not removed, but rather the suspension obtained in (2), comprising the sheet silicate, is used as such or in concentrated form. This process regime offers the advantage that, for example, no additional pasting agent, or less, for example and with preference water, need by used, for example, to prepare the shapeable material. Should, in the context of the present invention, such a concentrated suspension be used, the solids content of this suspension could, for example, be within a range from 10 to 50% by weight. The concentration can be effected, for example, by evaporative concentration of the suspension obtained in (2), by cross-flow filtration, for example under reduced pressure, or by dividing the suspension obtained in (2), removing the sheet silicate from a portion with optional drying and/or washing, and suspending the sheet silicate removed in the remaining part of the suspension.

One conceivable advantage of the two alternatives is that drying and calcining of the shaped body produced using the sheet silicate at suitable temperatures can give rise to the framework silicate in the shaped body and hence, compared to above-described processes, an energy-intensive calcination step, specifically the calcination step to prepare the framework silicate before the use of the silicate in (I), is dispensed with.

Use

The present invention further relates to the use of the inventive silicates, especially of the inventive framework silicates and/or of the inventive shaped bodies, as a molecular sieve, catalyst, catalyst support or binder thereof, as an adsorbent, pigment, additive in washing compositions, additive to building materials, for thixotropy in paint pastes and coatings, and applications as a glidant and lubricant, as a flame retardant, assistant and filler in paper products, in bactericidal and/or fungicidal and/or herbicidal compositions, for ion exchange, for production of ceramics, in polymers, in electrical, optical or electrooptical components and switching elements or sensors.

Reactions which can be catalyzed in principle by the inventive silicates are, for example, hydrogenations, dehydrogenations, oxydehydrogenations, oxidations, epoxidations, polymerization reactions, aminations, hydrations and dehydrations, nucleophilic and electrophilic substitution reactions, addition and elimination reactions, double bond and skeletal isomerizations, dehydrocyclizations, hydroxylations of heteroaromatics, epoxide-aldehyde rearrangements, metathesis reactions, olefin preparation from methanol, Diels-Alder reactions, formation of carbon-carbon bonds, for example olefin dimerization or olefin trimerization, and condensation reactions of the aldol condensation type. Depending on the molecule to be converted, the catalytic reactions can be performed in the gas or liquid phase, or else in a supercritical phase.

In principle, the inventive silicates are also suitable as a molecular sieve. In this case, it is advantageously possible to exploit the high internal surface area of the inventive material, in order also to separate molecules owing to their difference in molecule size. According to the separating task, the particular adsorption can be effected in the gas phase or the liquid phase, or in a supercritical phase. One example is the separation of constitutional isomers, for example the separation of n and iso isomers of small molecules. In the context of the present invention, "small molecule" refers to molecules with a kinetic diameter in the range from 3.5 to 5.5 Å. For definition of the kinetic diameter, reference is made to D. W. Breck, Zeolite Molecular Sieves, 1974, J. Wiley, pages 634-641. One example thereof is the separation of n- and i-butane. Mention should also be made, for instance, of the separation of configurational isomers, for example the separation of cis-butene and trans-butene. Finally, in this context, the separation of olefins in the liquid phase may also be mentioned. Such separations can be performed successfully especially when, among other conditions, the solvents used are compounds whose kinetic diameter is greater than or equal to the pore diameter of the silicate. In this connection, mention should be made, for instance, of t-butanol. Further solvents are alkanes or alkane mixtures, especially cyclohexane. For the olefin separations in the liquid phase mentioned, using cyclohexane as the solvent, mention should be made, for example, of the separation of pentenes and the separation of butenes, in which case the separation of butenes should be preferred over the separation of pentenes in the liquid phase in cyclohexane as the solvent. In particular, mention may be made of the trans-2-butene/1-butene separation and the trans-2-butene/isobutene separation, and likewise of the separation of trans-2-pentene from 1-pentene.

A further possible use of the silicates prepared in accordance with the invention, especially of the framework silicates prepared in accordance with the invention, is the use as an additive to catalysts, for example USY zeolites, which are used in cracking processes, especially in cracking processes in the liquid phase. One example in connection with the cracking processes is the preparation of lower olefins, for example propene, by catalytic cracking.

A further possible use of the silicates prepared in accordance with the invention, especially of the framework silicates prepared in accordance with the invention, is use as a washcoat which is applied to monoliths and then, optionally further laden with at least one noble metal, used as a catalyst, an especially preferred example here being automotive catalysts which are used for reduction of nitrogen oxides $NO_x$, carbon monoxide and/or hydrocarbons. Mention should also be of 3-way catalysts or catalysts which are used to reduce the level of exhaust gases from diesel engines.

Moreover, in the context of the present invention and of the inventive silicates, mention should be made of the use for removal of at least one alkane and/or at least one alkene and/or at least one alkyne from a substance mixture comprising at least two alkanes or at least two alkenes or at least two alkynes or at least one alkane and at least one alkene or at least one alkane and at least one alkyne or at least one alkene and at least one alkyne or at least one alkane and at least one alkene and at least one alkyne, especially for separating constitutional isomers and/or configurational isomers, where the at least one alkane and/or at least one alkene and/or at least one alkyne has up to 10 carbon atoms, for example 1 carbon atom in the case of methane, or 2, 3, 4, 5, 6, 7, 8, 9 or 10 carbon atoms.

Equally, the inventive silicate, or that prepared in accordance with the invention, especially the framework silicate, or a shaped body which comprises this silicate, can in principle be used, for example, to separate olefin or polyolefin and carbon dioxide, for example to purify polyethylene or polypropylene, or as a catalyst for amination, for example for preparing methylamine and/or dimethylamine from methanol and ammonia or from synthesis gas and ammonia, to preferably obtain a low proportion of trimethylamine, or for polymerizations, for example to prepare polytetrahydrofuran from tetrahydrofuran, or as a hydroxylation catalyst, for example to prepare phenol from benzene, or generally for conversion reactions with 6-membered aromatic rings, or for conversion of cyclohexanone to cyclohexanone oxime, or for Beckmann rearrangements, for example for conversion of cyclohexanone oxime to caprolactam or for activation of C—C triple bonds or for dehydrogenating cycle formation (aromatization).

The present invention therefore relates to the use of a framework silicate of the Ga—RRO structure or of a shaped body comprising Ga—RRO for dehydrogenating cycle formation.

The present invention likewise relates to the use of a framework silicate of the Zn—RRO structure or of a shaped body comprising Zn—RRO for activation of C—C triple bonds.

It has been found that, surprisingly, the novel material, especially the novel framework silicate of the RUB-41 structure, has a very high absorption capacity for 6-membered aromatic or heteroaromatic rings, especially for benzene. It is accordingly intended also to use the novel material for the removal of benzene from mixtures comprising benzene.

When the inventive framework silicate or the shaped body comprising this framework silicate is used as an adsorbent, for example for substance separation, the desorption of the adsorbed compound or of the adsorbed compounds can be accomplished either by a suitable reduction in the pressure and/or a suitable temperature change, such as more preferably by a suitable temperature increase, and/or by contacting the framework silicate or the shaped body comprising this framework silicate with at least one compound which is more strongly adsorbed than the compound or compounds to be desorbed.

Regeneration

In a further embodiment of the process according to the invention, the framework silicate and/or the shaped bodies, after being used in the technical field in question, are regenerated by a process in which the regeneration is effected by controlled burn off of the deposits responsible for the decreasing performance. Preference is given to working in an inert gas atmosphere which comprises exactly defined amounts of oxygen-providing substances. One such regeneration process is described in WO 98/55228 and DE 197 23 949 A1, especially in column 2 lines 33 to 54 of DE 197 23 949 A1, the disclosure of which on this subject is hereby incorporated fully into the subject matter of the present application by reference.

The framework silicate to be regenerated and/or the shaped bodies, either in the apparatus, for example the tubular reactor, or in an external oven, are heated in an atmosphere which comprises 0.1 to about 20 parts by volume of oxygen-providing substances, more preferably 0.1 to 20 parts by volume of oxygen, to a temperature in the range from 250° C. to 600° C., preferably from 400° C. to 550° C. and especially from 450° C. to 500° C. The heating is performed preferably at a heating rate of 0.1° C./min to 20° C./min, preferably from 0.3° C./min to 15° C./min and especially from 0.5° C./min to 10° C./min.

During this heating phase, heating is effected up to a temperature at which most of the organic deposits begin to decompose, while the temperature is simultaneously controlled via the oxygen content and hence does not rise to such an extent as to result in damage to the framework silicate and/or shaped body structure. The slow increase in the temperature and residence at low temperature by establishing the appropriate oxygen content and the appropriate heating power are important steps for preventing local overheating of the framework silicate and/or of the shaped bodies in the case of high organic loadings.

When the temperature of the offgas stream at the reactor outlet falls in spite of rising amounts of oxygen-providing substances in the gas stream, the burnoff of the organic deposits has ended. The duration of the treatment is generally in each case 1 to 30, preferably about 2 to about 20 and especially about 3 to about 10 hours.

The subsequent cooling of the framework silicate thus regenerated and/or of the shaped bodies is preferably performed in such a way that the cooling is not too rapid, since the mechanical stability, for example, of the shaped bodies can otherwise be adversely affected.

It may be necessary for the regeneration performed by calcination, as described above, to be followed by a purge with water and/or dilute acids, for example hydrochloric acid, in order to remove any inorganic loading (alkali traces, etc.) which remains as a result of contamination of the reactants. Subsequently, another drying and/or another calcination can be performed.

In a further embodiment of the process according to the invention, the framework silicate at least partly deactivated for the particular technical field of use and/or the shaped bodies, before being heated in the regeneration procedure, can be washed with a solvent in the conversion reactor or in an external reactor in order to remove product of value still adhering. The washing is performed such that the particular adhering products of value can be removed, but temperature and pressure are not selected at such a high level that the usually organic deposits are likewise removed. Preference is given to merely rinsing with a suitable solvent. Thus, for this washing operation, all solvents in which the particular product of value has good solubility are suitable. The amount of solvent used and the duration of the washing operation are not critical. The washing operation can be repeated more than once and can be performed at elevated temperature. In the case of use of $CO_2$ as the solvent, supercritical pressure is preferred; otherwise, the washing operation can be effected under standard pressure or elevated or supercritical pressure. The ending of the washing operation is generally followed by drying. Although the drying operation is generally uncritical, the drying temperature should not exceed the boiling temperature of the solvent used for washing to too great a degree, in order to prevent abrupt evaporation of the solvent in the pores, especially in the micropores, since this can also lead to damage to the lattice structure.

For process optimization, it is possible to use at least two apparatuses, each of which comprises the inventive framework silicate and/or the shaped bodies, in which case, in the case of regeneration, at least one apparatus is taken out of operation and at least one apparatus remains in operation, such that the process need not be stopped at any time.

The present invention is illustrated in detail with reference to the examples and figures described below.

In the figure, the angle (2 theta) in ° (degrees) is shown on the abscissa; the intensities are plotted on the ordinate.

Figure 5:
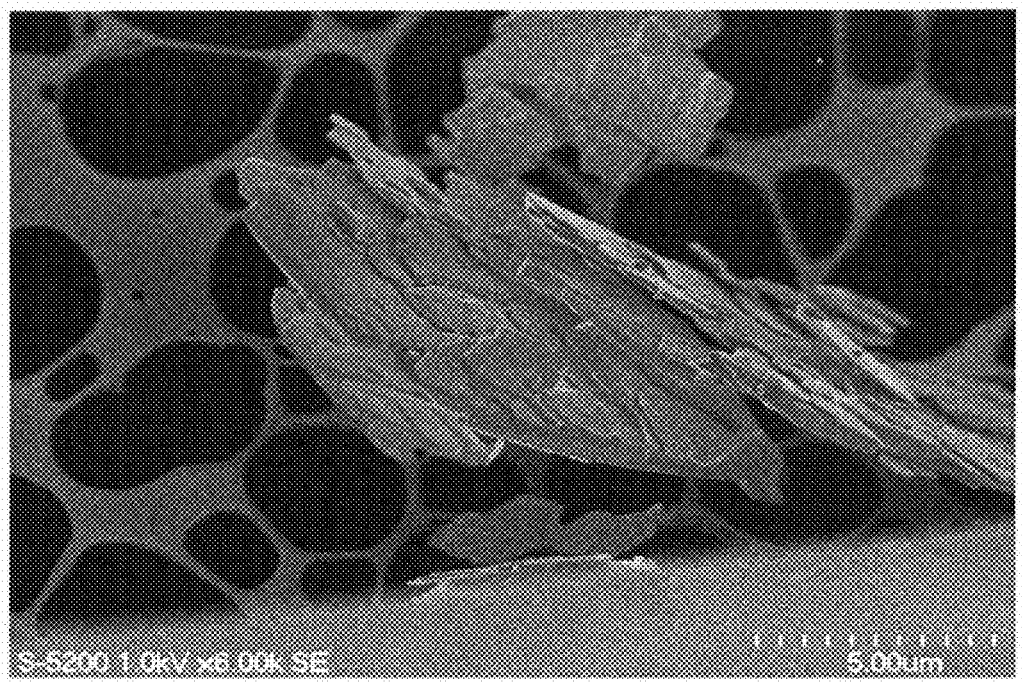

FIG. 5 shows an FE-SEM image of the framework silicate of the Zn-RUB-41 structure obtained according to Example 6.

EXAMPLES

Example 1: Preparation of Ga-RUB-39

1.0 g of deionized water in which 0.042 g of gallium nitrate had been dissolved, 11.5 g of aqueous template solution (16% by weight dimethyldi-n-propylammonium hydroxide (DMDPAH) solution), 1.48 g of fumed silica (Cab-O-Sil M7D) and 0.02 g of Si-RUB-39 as a crystallization assistant were used to prepare a colloidal solution with stirring. The mixture was transferred into a Teflon-lined autoclave. Within 7 days, hydrothermal crystallization was effected at 150° C. with rotation of the autoclave. A Ga-RUB-39 was obtained, and the Ga-RUB-39 crystals were filtered off, washed with distilled water and dried at 70° C. for 24 h.

Example 2: Preparation of Ga-RUB-41

Figure 1:
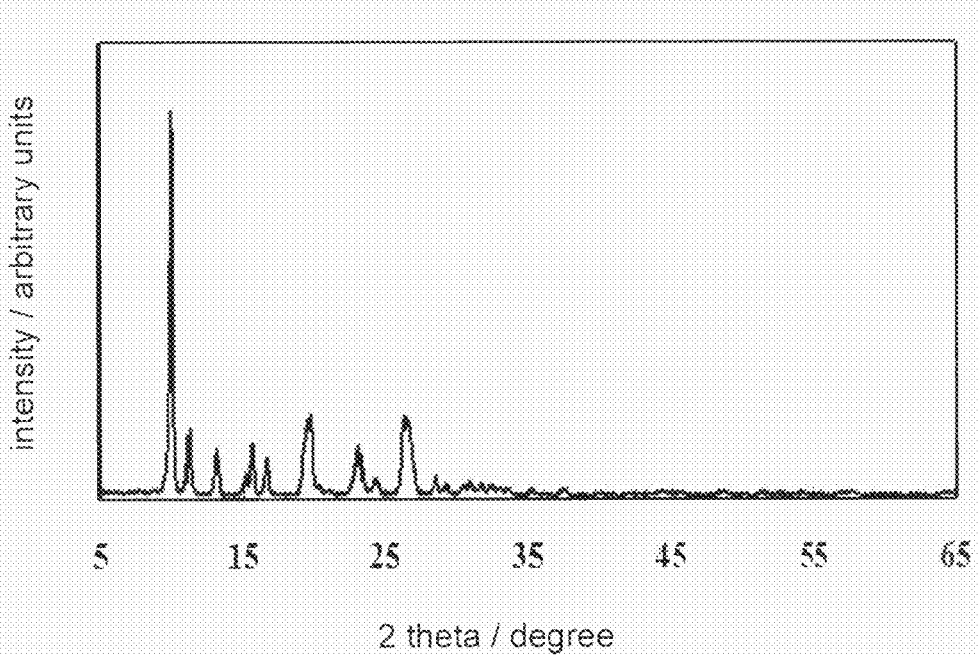
FIG. 1 shows the powder x-ray diffractogram of the framework silicate of the Ga-RUB-41 structure obtained according to Example 2. The powder x-ray diffractogram was recorded by means of monochromatic Cu K alpha-1 radiation. The diffraction data were collected with a position-sensitive detector in the range from 5 to 65° (2 theta). In the figure, the angle (2 theta) in ° (degrees) is shown on the abscissa; the intensities are plotted on the ordinate.
Figure 2:
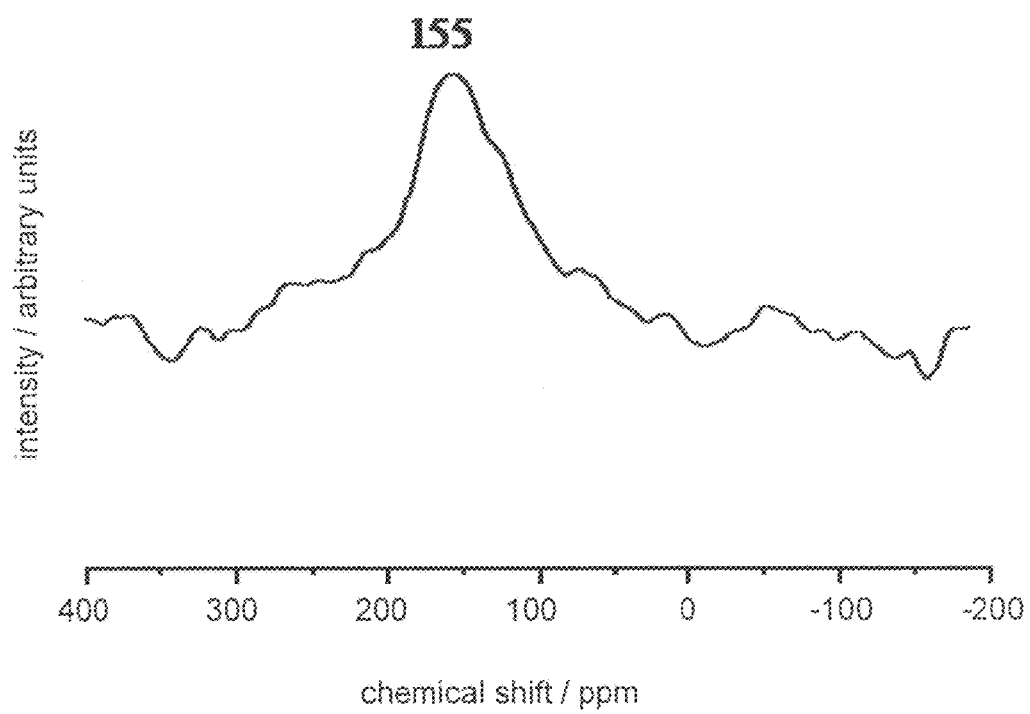
FIG. 2 shows the $^{71}$Ga NMR of the framework silicate of the Ga-RUB-41 structure obtained according to Example 2.
Figure 3:
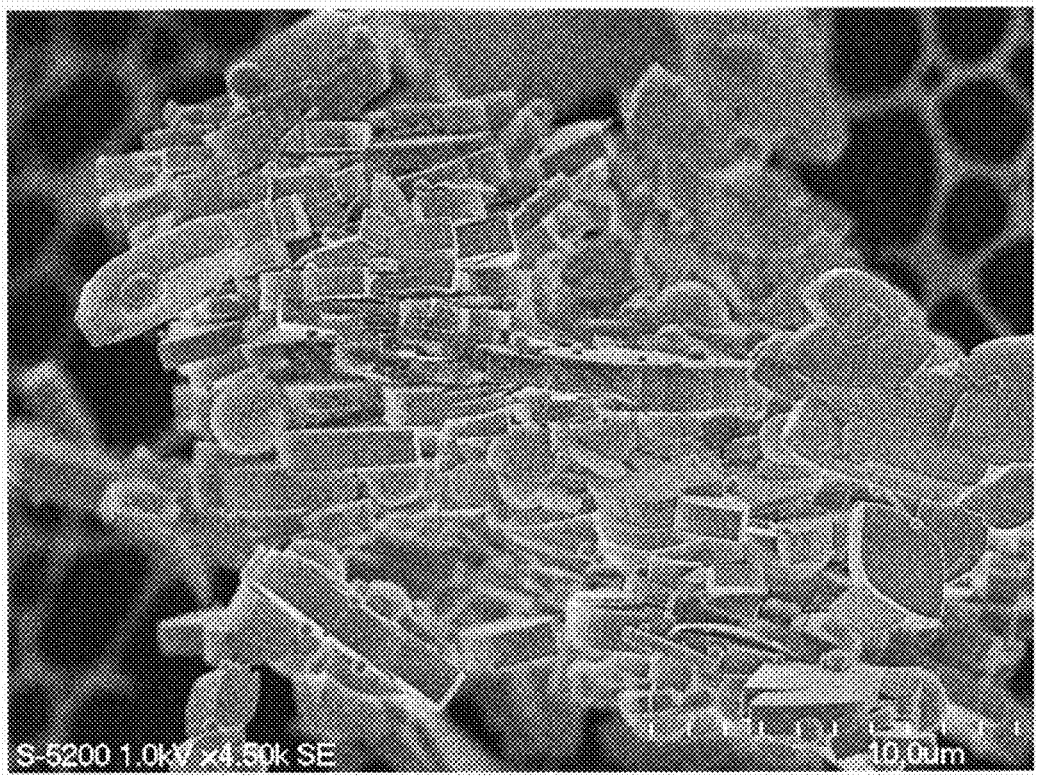
FIG. 3 shows an FE-SEM image of the framework silicate of the Ga-RUB-41 structure obtained according to Example 2.

The Ga-RUB-39 obtained according to Example 1 was calcined at 540° C. for 12 h. The yield was about 60%. The phase purity of the Ga-RUB-41 obtained was demonstrated by XRD analysis of the material obtained (see FIG. 1), The elemental analysis by means of ICP for Si and Ga showed that the molar Si:Ga ratio in the product was about 95:1. By means of $^{71}$Ga NMR analysis, it was possible to show that the Ga in the Ga-RUB-41 obtained was present in the silicate lattice in a tetrahedral lattice environment (see FIG. 2). The morphology of the Ga-RUB-41 material obtained was studied by means of FE-SEM (see FIG. 3).

Example 3: Preparation of Zn-RUB-39

1.0 g of deionized water in which 0.07 g of zinc nitrate had been dissolved, 11.5 g of aqueous template solution (16% by weight dimethyldi-n-propylammonium hydroxide (DMDPAH) solution), 1.48 g of fumed silica (Cab-O-Sil M7D) and 0.02 g of Si-RUB-39 as a crystallization assistant were used to prepare a colloidal solution with stirring. The mixture was transferred to a Teflon-lined autoclave. Within 8.5 days, hydrothermal crystallization was effected at 150° C. with rotation of the autoclave. A Zn-RUB-39 was obtained, and the Zn-RUB-39 crystals were filtered off, washed with distilled water and dried at 70° C. for 24 h.

Example 4: Preparation of Zn-RUB-41

Figure 4:
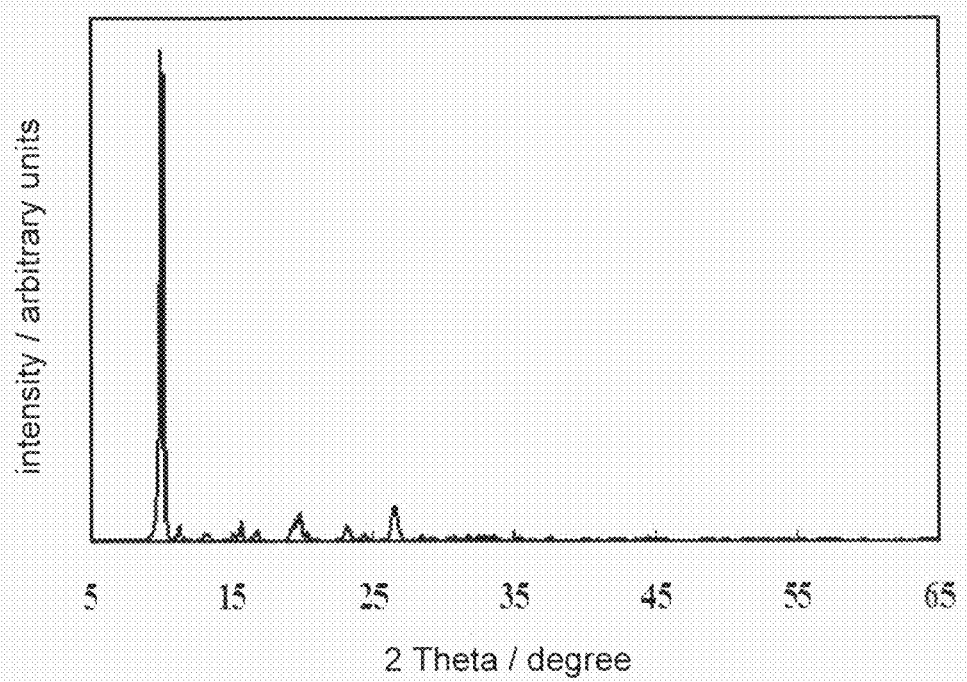
FIG. 4 shows the powder x-ray diffractogram of the framework silicate of the Zn-RUB-41 structure obtained according to Example 4. The powder x-ray diffractogram was recorded by means of monochromatic Cu K alpha-1 radiation. The diffraction data were collected with a position-sensitive detector in the range from 5 to 65° (2 theta).

The Zn-RUB-39 obtained in Example 3 was calcined at 540° C. for 12 h. The yield was about 75%. The phase purity of the Ga-RUB-41 obtained was demonstrated by XRD analysis of the material obtained (see FIG. 4). Elemental analysis by means of ICP for Si and Zn showed that the molar Si:Zn ratio in the product was about 176:1. The morphology of the Ga-RUB-41 material obtained was analyzed by means of FE-SEM (see FIG. 5).

The invention claimed is:

1. A sheet silicate comprising at least silicon, oxygen and at least one heteroatom selected from the group consisting of Ga and Zn, said sheet silicate being obtained by a process comprising:
 (1) preparing a colloidal aqueous solution from
  at least one silicon dioxide source,
  at least one dimethyl-di-n-propylammonium hydroxide (DMDPAH),
  at least one base,
  a sheet silicate of the RUB-39 structure, and
  at least one heteroatom source selected from the group consisting of a Ga source and a Zn source;
 (2) hydrothermally crystallizing by heating the colloidal aqueous solution obtained in (1) to a temperature in a range from greater than the boiling temperature of the colloidal aqueous solution under the selected pressure to 180° C. at standard pressure to obtain a suspension comprising at least one silicate comprising silicon, oxygen and at least the heteroatom selected from the group consisting of Ga and Zn,
  wherein the colloidal aqueous solution obtained in (1), before heating in (2), comprises silicon, calculated as $SiO_2$, gallium or zinc, calculated as $Ga_2O_3$ and ZnO, respectively, DMDPAH, water, and the sheet silicate of the RUB-39 structure, such that a weight ratio of $SiO_2$:($Ga_2O_3$ or ZnO):DMDPAH:water:sheet silicate of the RUB-39 structure in the solution is
  1:(0.001-0.05):(0.4-10):(4-12):(0.001-5),
  wherein the sheet silicate has the RUB-39 structure, with an x-ray diffraction pattern comprising at least the following reflections:
 intensity of 100% at a diffraction angle 2θ/° of 8.0 to 8.4;
 intensity of 11 to 21% at a diffraction angle 2θ/° of 11.0 to 11.4;
 intensity of 13 to 23% at a diffraction angle 2θ/° of 13.2 to 13.6;
 intensity of 5 to 15% at a diffraction angle 2θ/° of 18.0 to 18.4;
 intensity of 7 to 17% at a diffraction angle 2θ/° of 18.4 to 18.8; and
 intensity of 19 to 29% at a diffraction angle 2θ/° of 19.9 to 20.0,
 wherein an intensity of 100% is the intensity of the maximum peak in the x-ray diffraction pattern generated by Cu K alpha 1 radiation.

2. The sheet silicate according to claim 1, comprising Ga and Zn in the silicate lattice.

3. The sheet silicate according to claim 1, wherein the sheet silicate of the RUB-39 structure added in (1), based on silicon dioxide and/or on silicon dioxide present in the silicon dioxide precursor, is added in an amount of 0.001 to 5% by weight.

4. The sheet silicate according to claim 1, wherein the colloidal solution obtained in (1), optionally after concentration, is heated in (2) in an autoclave to a temperature of 100 to 180° C. for a period in the range from 12 h to 240 h.

5. The sheet silicate according to claim 1, wherein amorphous silicon dioxide is used in (1).

6. The sheet silicate according to claim 1, wherein the heteroatom source is gallium nitrate and/or zinc nitrate.

7. The sheet silicate according to claim 1, wherein the solution obtained in (1), before being heated in (2), comprises silicon, calculated as $SiO_2$, gallium, calculated as $Ga_2O_3$, DMDPAH, water and the sheet silicate of the RUB-39 structure, such that a weight ratio of $SiO_2$:$Ga_2O_3$:DMDPAH:water:sheet silicate of the RUB-39 structure in the solution is
 1:(0.001-0.05):(0.4-10):(4-12):(0.001-5).

8. The sheet silicate according to claim 1, wherein the concentrated solution obtained in (1), before being heated in (2), comprises silicon, calculated as $SiO_2$, zinc, calculated as ZnO, DMDPAH, water and the sheet silicate of the RUB-39 structure, such that a weight ratio of $SiO_2$:ZnO:DMDPAH:water: sheet silicate of the RUB-39 structure is 1:(0.001-0.05):(0.4-10):(4-12):(0.001-5).

9. The sheet silicate according to claim 1, wherein a further heteroatom source used additionally in (1) is a heteroatom source selected from the group consisting of an aluminum source, a boron source, an iron source, a titanium source, a tin source, a germanium source, a zirconium source, a vanadium source, a niobium source and a mixture of two or more of these heteroatom sources.

10. A framework silicate, comprising at least silicon, oxygen and at least one heteroatom selected from the group consisting of Ga and Zn, said framework silicate being obtained by a process comprising:
    (1) preparing a colloidal aqueous solution from
        at least one silicon dioxide source,
        at least one tetraalkylammonium compound comprising $R_1R_2R_3R_4N^+$ where $R_1$ and $R_2$ are each methyl and both $R_3$ and $R_4$ are n-propyl,
        at least one base,
        a sheet silicate of the RUB-39 structure, and at least one heteroatom source selected from the group consisting of a Ga source and a Zn source;
    (2) hydrothermally crystallizing by heating the colloidal aqueous solution obtained in (1) to a temperature in a range from greater than the boiling temperature of the colloidal aqueous solution under the selected pressure to 180° C. at standard pressure to obtain a suspension comprising at least one silicate comprising silicon, oxygen and at least the heteroatom selected from the group consisting of Ga and Zn,
        wherein the colloidal aqueous solution obtained in (1), before heating in (2), comprises silicon, calculated as $SiO_2$, gallium or zinc, calculated as $Ga_2O_3$ and ZnO, respectively, dimethyl-di-n-propylammonium hydroxide (DMDPAH) as the tetraalkylammonium compound, water, and the sheet silicate of the RUB-39 structure, such that a weight ratio of $SiO_2$:($Ga_2O_3$ or ZnO):DMDPAH:water:sheet silicate of the RUB-39 structure in the solution is 1:(0.001-0.05):(0.4-10):(4-12):(0.001-5);
    (3) removing the at least one silicate comprising silicon, oxygen and at least one heteroatom from the suspension obtained in (2);
    (4) optionally washing the silicate removed in (3);
    (5) drying the silicate obtained in (3) or (4); and
    (6) calcining the at least one silicate comprising silicon, oxygen and at least one heteroatom which is obtained in (5) to obtain a framework silicate,
    wherein the framework silicate has the RRO structure, with an x-ray diffraction pattern comprising at least the following reflections:
    intensity of 100% at a diffraction angle 2θ/° of 9.8 to 10.2;
    intensity of 24 to 34% at a diffraction angle 2θ/° of 11.0 to 11.4;
    intensity of 9 to 19% at a diffraction angle 2θ/° of 15.5 to 15.9;
    intensity of 12 to 22% at a diffraction angle 2θ/° of 19.4 to 19.6; and
    intensity of 19 to 29% at a diffraction angle 2θ/° of 19.6 to 19.8,
    wherein an intensity of 100% is the intensity of the maximum peak in the x-ray diffraction pattern generated by Cu K aloha 1 radiation.

11. The framework silicate according to claim 10, comprising Ga and Zn in the silicate lattice.

12. A shaped body comprising at least one framework silicate according to claim 11.

13. A catalyst for dehydrogenating cycle formation comprising a framework silicate of the Ga-RRO structure according to claim 10.

14. A catalyst for activating C—C triple bonds comprising a framework silicate of the Zn-RRO structure according to claim 10.

* * * * *

UNITED STATES PATENT AND TRADEMARK OFFICE
CERTIFICATE OF CORRECTION

PATENT NO. : 10,226,763 B2
APPLICATION NO. : 14/947981
DATED : March 12, 2019
INVENTOR(S) : Ulrich Mueller et al.

It is certified that error appears in the above-identified patent and that said Letters Patent is hereby corrected as shown below:

On the Title Page

Item [56], OTHER PUBLICATIONS delete "Caro, J. et al., "Zeolite membranes - state of their development and perspective", Microoorous and Mesooorous Materials 38 2000, 3-24." insert -- Caro, J. et al., "Zeolite membranes - state of their development and perspective", Microporous and Mesoporous Materials 38 2000, 3-24. --

Page 2 item [56], OTHER PUBLICATIONS delete "Caro, Juergen et al., "Zeolite membranes - Recent developments and progress", Microoorous and Mesooorous Materials 115 2008, 215-233." insert -- Caro, Juergen et al., "Zeolite membranes - Recent developments and progress", Microporous and Mesoporous Materials 115 2008, 215-233. --

Page 2 item [56], OTHER PUBLICATIONS delete "Munzer, Simon et al., "Preparation and characterization of sodium-free nanocrystalline sodalite", MicroQorous and MesoQorous Materials 110 2008, 3-10." insert -- Munzer, Simon et al., "Preparation and characterization of sodium-free nanocrystalline sodalite", Microporous and Mesoporous Materials 110 2008, 3-10. --

Page 2 item [56], OTHER PUBLICATIONS delete "Van Der Donk, George et al., "Formation of clathrasillayers by secondary growth of DOH-type nuclei for gas separation applications", MicroQorous and Mesooorous Materials 115 2008, 3-10." insert -- Van Der Donk, George et al., "Formation of clathrasil layers by secondary growth of DOH-type nuclei for gas separation applications", Microporous and Mesoporous Materials 115 2008, 3-10. --

Page 2 item [56], OTHER PUBLICATIONS delete "YUAN, S. et al., " Siting of B, Al, Ga or Zn And Bridging Hydroxyl Groups In Mordenite: An Ab 1nitio Study", JOURNAL OF MOLECULAR CATALYSIS A; CHEMICAL, Vol. 175, No. 1-2, Page 131-138, (2001) XP002520807" and insert -- YUAN, S. et al., " Siting of B, Al, Ga or Zn And Bridging Hydroxyl Groups In Mordenite: An Ab Initio Study", JOURNAL OF MOLECULAR CATALYSIS A; CHEMICAL, Vol. 175, No. 1-2, Page 131-138, (2001) XP002520807. --

Signed and Sealed this
Twenty-sixth Day of May, 2020

Andrei Iancu
*Director of the United States Patent and Trademark Office*

CERTIFICATE OF CORRECTION (continued)
U.S. Pat. No. 10,226,763 B2

In the Specification

Column 15, Line 23, delete "amiphilic" and insert -- amphiphilic --

In the Claims

Column 27, Line 38, Claim 10, delete "$SiO_:(Ga_2O_3$" and insert -- $SiO_2:(Ga_2O_3$ --

Column 28, Line 27, Claim 10, delete "aloha" and insert -- alpha --